United States Patent Office 2,702,745
Patented Feb. 22, 1955

2,702,745

STYPHNATE COMPOUND AND PRIMING COMPOSITION THEREOF

Joseph F. Kenney, Huntington, Conn., asssignor to Remington Arms Company, Inc., Bridgeport, Conn., a corporation of Delaware No Drawing. Application August 2, 1952,
Serial No. 302,418

4 Claims. (Cl. 52—4)

This invention relates to a new composition of matter which is of an explosive character and highly useful as an ingredient of deflagrating compositions, particularly priming mixtures for small arms ammunition.

The composition is a complex of two salts of styphnic acid and a salt of hypophosphorous acid. One method for the preparation of a laboratory quantity is as follows:

10 grams of styphnic acid is suspended in about 100 cc. of water at 40° C. To this suspension there is added, under agitation, about 10 cc. of 8-normal potassium hydroxide and about 5 grams of sodium hypophosphite. The temperature is then raised to between 60° C. and 80° C., preferably about 75° C., and a solution of 25 grams of lead nitrate in 50 cc. of water is added dropwise, with stirring. The addition of the lead nitrate solution is completed in about 30 minutes. Stirring is continued for from 30 to 45 minutes, the temperature being maintained between 70° C. and 75° C. The precipitate is in the form of thin plates, the faces of which are typically elongated parallelograms, the ends of such parallelograms being parallel and inclined to a perpendicular to the parallel sides at an angle of about 20°. The length of an average crystal is about three times its width, and the crystals are a brown color. Analysis shows that they contain the hypophosphite radical, about 2.4% potassium, about 39.9% lead, and about 2.2% phosphorus, substantially conforming to the structural formula

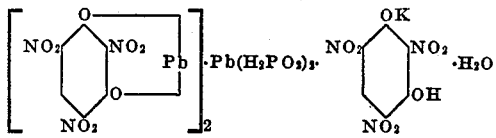

The product, which will be called "potassium styphnate·lead styphnate·lead hypophosphite," is sensitive to percussion and moderately sensitive to static electricity. In admixture with 10% glass and in an unanviled primer cup its average firing point under the impact of a falling 2-oz. weight is 1.95" and the standard variation in sensitivity is 1.3". In a static test, 100% fires are secured by the discharge of a 300μμf. condenser at 500 volts and 20% fires secured by the discharge of a 300μμf. condenser at 200 volts. Its explosion point on a temperature gradient bar is above 250° C. It has an apparent density of 1.035 grams per cc.

Another method of preparing potassium styphnate·lead styphnate·lead hypophosphite is as follows:

To a suspension of 10 grams of styphnic acid in 100 cc. of water at a convenient temperature, say 40° C., there is added, with stirring, about 1.64 grams of magnesium oxide and subsequently 5 to 10 grams of potassium nitrate and 5 grams of sodium hypophosphite. Stirring is continued for about 10 minutes. The temperature is then raised to form 60° C. to 80° C., preferably 75° C., and a solution of 25 grams of lead nitrate in 50 cc. of water is added dropwise over a period of about 30 minutes. As before, stirring is continued for from 30 to 45 minutes, the temperature being maintained between 70° C. and 75° C. The precipitate is substantially identical with that resulting from the method first above described.

In admixture with an initiating explosive and an oxidizer, the new composition constitutes an excellent primer for small arms ammunition, particularly of the rimfire type. It has the extraordinary property of enabling the production of a rimfire priming mixture without the use of glass or other comparable abrasive, and in this respect it enables the attainment of an elusive and long-sought objective in this field. It has long been recognized that the glass commonly used in rimfire priming mixtures is highly erosive to gun barrels, but compositions hitherto used have contained glass as an ingredient necessary to adequate sensitivity. Adequately sensitive and stable rimfire mixtures can be made by the use of the composition of the present invention without glass or other abrasive and without the use of any separate fuel ingredient. Production is thus simplified by the elimination of a plurality of ingredients heretofore deemed necessary. Typical priming mixtures are as follows:

|  | Range, percent | Preferred, percent |
|---|---|---|
| Normal Lead Styphnate | 0 to 50 | 36 |
| Tetrazene | 1 to 5 | 4 |
| Potassium Styphnate·Lead Styphnate·Lead Hypophosphite | 2 to 50 | 10 |
| Barium Nitrate | 40 to 65 | 50 |

This composition has an average sensitivity to the impact of a falling 2-oz. weight of 6.42", and a sensitivity variation of 0.82". The average sensitivity is comparable with that of mixtures in common commercial use, and the sensitivity variation is substantially less. The mixture is also very stable under moist storage. In a standard barrel time test, the freshly prepared mixture gave an average barrel time of 2.58 milliseconds, with a variation of 0.179 millisecond. After three days' storage, at 120° F., 90% R. H., the average barrel time was 2.83 milliseconds, and the variation 0.215 millisecond. After twenty-six days of such storage, the average barrel time was 3.04 milliseconds, and the variation 3.41 milliseconds. A commercial mixture used as a standard of comparison had, when fresh, comparable barrel time and variation, but after three days' storage a substantially greater barrel time and variation, while after twenty-six days' storage it misfired completely.

This application is a continuation-in-part of applicant's co-pending application, Serial No. 242,037, filed August 15, 1951, now abandoned.

What is claimed is:
1. The composition of matter potassium styphnate·lead styphnate·lead hypophosphite.
2. A deflagrating composition comprising as its essential ingredients the complex potassium styphnate·lead styphnate·lead hypophosphite, an explosive, and an oxidizer.
3. A priming mixture for small arms ammunition consisting essentially of

|  | Per cent |
|---|---|
| Normal lead styphnate | 0 to 50 |
| Tetrazene | 1 to 5 |
| Potassium styphnate·lead styphnate·lead hypophosphite | 2 to 50 |
| Barium nitrate | 40 to 65 |

4. A priming mixture for small arms ammunition consisting essentially of

|  | Per cent |
|---|---|
| Normal lead styphnate | 36 |
| Tetrazene | 4 |
| Potassium styphnate·lead styphnate·lead hypophosphite | 10 |
| Barium nitrate | 50 |

References Cited in the file of this patent

UNITED STATES PATENTS

| 2,350,670 | Brun et al. | June 6, 1944 |
| 2,352,964 | McNutt | July 4, 1944 |

FOREIGN PATENTS

| 582,976 | Great Britain | Dec. 4, 1946 |